US005809472A

United States Patent [19]

Morrison

[11] Patent Number: 5,809,472

[45] Date of Patent: Sep. 15, 1998

[54] DIGITAL AUDIO DATA TRANSMISSION SYSTEM BASED ON THE INFORMATION CONTENT OF AN AUDIO SIGNAL

[75] Inventor: Eric Fraser Morrison, Redwood City, Calif.

[73] Assignee: Command Audio Corporation, Redwood City, Calif.

[21] Appl. No.: 627,947

[22] Filed: Apr. 3, 1996

[51] Int. Cl.[6] .......... H04L 5/22; G10L 3/00

[52] U.S. Cl. .......... 704/500; 704/229; 704/206

[58] Field of Search .......... 395/2.91, 2.1, 395/2.92, 2.15, 2.75, 2.94; 370/435, 521, 341; 380/9; 704/229, 230, 222, 233, 200

[56] References Cited

U.S. PATENT DOCUMENTS

| | | | |
|---|---|---|---|
| 3,718,767 | 2/1973 | Ellis | 179/15 |
| 4,331,837 | 5/1982 | Soumagne | 179/1 |
| 4,476,559 | 10/1984 | Brolin et al. | 370/110.1 |
| 4,809,271 | 2/1989 | Kondo et al. | 370/110.1 |
| 4,916,742 | 4/1990 | Kolesnikov et al. | 381/30 |
| 5,121,391 | 6/1992 | Paneth et al. | 370/95.1 |
| 5,406,626 | 4/1995 | Ryan | 380/9 |
| 5,444,312 | 8/1995 | Noblett et al. | 327/552 |
| 5,452,289 | 9/1995 | Sharma et al. | 370/32.1 |
| 5,467,087 | 11/1995 | Chu | 354/51 |
| 5,524,051 | 6/1996 | Ryan | 380/9 |
| 5,590,195 | 12/1996 | Ryan | 380/9 |

FOREIGN PATENT DOCUMENTS 0 279 451 8/1988 European Pat. Off. .

OTHER PUBLICATIONS

John Saunders, Real–Time Discrimination of Broadcast Speech/Music, Proceedings of International Conference of Audio Speech and Signal Processing (ICASSP)—IEEE 1996, pp. 993–996.

*Primary Examiner*—David R. Hudspeth
*Assistant Examiner*—Donald L. Storm
*Attorney, Agent, or Firm*—Skjerven, Morrill, MacPherson, Franklin & Friel LLP; Norman R. Klivans; Glen B. Choi

[57] ABSTRACT

The data rate of speech and non-speech audio is selectively reduced by respective compression techniques based upon the information content of the type of signal. A composite audio information signal formed of speech and non-speech audio is applied to both a voice encoder and a wide-band audio compression encoder. An audio-type detection circuit examines the speech spectrum as well as the entire frequency spectrum and dynamic range of the audio information and generates a selection signal indicating whether the signal is speech or non-speech audio. A composite encoded audio signal is produced by intermingling the outputs of the encoders in response to the selection signal. The composite encoded audio signal and an identification signal indicative of the audio signal type are transmitted to respective receivers at the reduced data rates for storage, and subsequent decoding and retrieval by a listener as an audible signal in response to the transmitted identification signal.

108 Claims, 5 Drawing Sheets

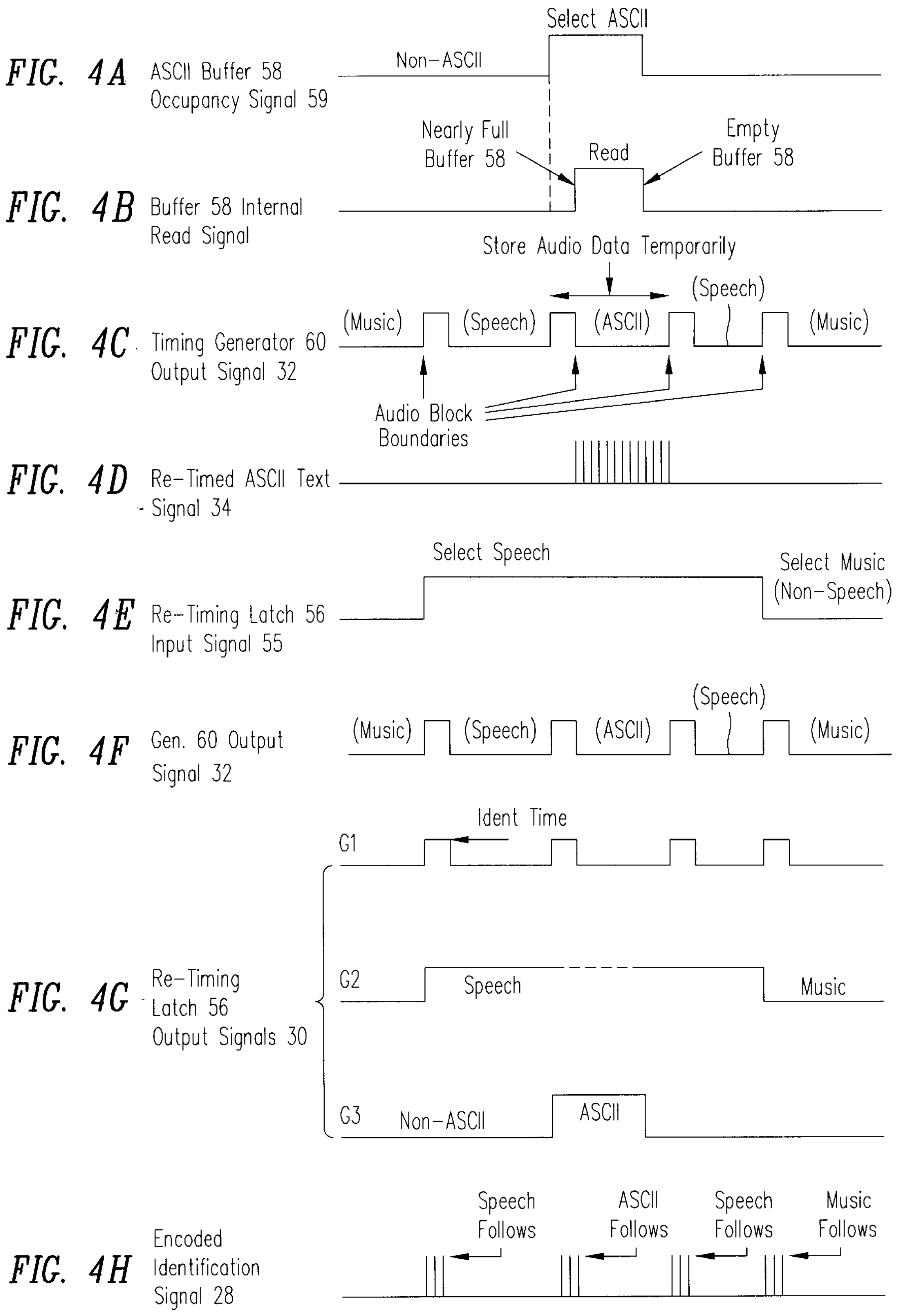
FIG. 4A
ASCII Buffer 58
Occupancy Signal 59
Select ASCII
Non-ASCII
FIG. 4B
Buffer 58 Internal
Read Signal
Nearly Full
Buffer 58
Read
Empty
Buffer 58
FIG. 4C
Timing Generator 60
Output Signal 32
Store Audio Data Temporarily
(Music)
(Speech)
(ASCII)
(Speech)
(Music)
Audio Block
Boundaries
FIG. 4D
Re-Timed ASCII Text
Signal 34
FIG. 4E
Re-Timing Latch 56
Input Signal 55
Select Speech
Select Music
(Non-Speech)
FIG. 4F
Gen. 60 Output
Signal 32
(Music)
(Speech)
(ASCII)
(Speech)
(Music)
FIG. 4G
Re-Timing
Latch 56
Output Signals 30
Ident Time
G1
G2
Speech
Music
G3
Non-ASCII
ASCII
FIG. 4H
Encoded
Identification
Signal 28
Speech
Follows
ASCII
Follows
Speech
Follows
Music
Follows

DIGITAL AUDIO DATA TRANSMISSION SYSTEM BASED ON THE INFORMATION CONTENT OF AN AUDIO SIGNAL

BACKGROUND OF THE INVENTION

The invention relates to the transmission of digital audio signals over narrow band data channels and, more particularly, to the reduction of the data rate of transmission and reception of a digital audio signal based on the information content of the signal, that is, based on whether the audio signal is speech or non-speech. The channels consist of point-to-point digital telephony links and audio broadcast services where normally narrow bandwidth channels would degrade the quality of the recovered audio signals.

A digitized audio source signal requires considerable channel bandwidth to transmit the full frequency range and dynamic range of the original analog source signal. Digital audio compression techniques, such as proposed for the Moving Picture Experts Group-2 (MPEG-2) transmissions described in the industry standard ISO 11172-3, take advantage of the psycho-acoustical characteristics of the ear-brain combination to reduce the channel bandwidth by reducing the data rate of the digitized signal. In a practical application of the concept, the reductions achieved generally are insufficient when compared to the bandwidth of the original analog source signal.

Voice encoders used for transmitting digitized speech in extremely narrow bandwidths find application in the telecommunications industry where only narrow bandwidth channels are available. The encoder reduces the data rate of the speech signals by converting the information using a model of the human voice generation process. The coefficients of the model representing a measurement of the speaker's voice are transmitted to a receiver which converts the coefficients to a voice presentation of the original source signal. Such a technique provides exceptional data rate compression of spoken audio, but only is applicable to speech signals since it is based on recognition and electronic modeling of speech. It follows that these voice encoders work very efficiently for voice signals but are unable to process other types of non-speech signals such as music.

Accordingly, in order to transmit and receive both speech and non-speech signals such as music, it is necessary to provide an alternate data compression scheme when such non-speech audio signals are to be transmitted and received. Thus, in any practical audio signal transmission/reception system where both speech and non-speech are intermingled to form the audio information, some means must be provided to detect the type of audio signal and to adapt the compression scheme to the audio type, whereby the technique used to compress the respective audio signal may be optimized to maximize the data rate while providing the best possible speech and non-speech quality.

SUMMARY OF THE INVENTION

The invention circumvents the problems associated with optimizing the data rate of speech and non-speech audio information while maintaining the best quality possible for each type of audio in applications where the signals are intermingled. To this end, the invention reduces the data rate of the digital audio signal based on the information content of the signal. The type of signal to be data compressed (usually speech or music) is determined and the optimum compression, based on information content, is applied.

Advantageously, the reduced data rate requires less channel bandwidth and/or allows more signals on a given transmission channel. In the case of a system where the received audio information is stored in a memory for later retrieval, the information may be sent at a higher speed thereby reducing the transmission time as well.

The majority of communicated information is in the form of the spoken word by a recognizable voice. In order to optimize the efficiency of transmitting audio information, significant reductions in data rate are achieved by applying the digitized speech signal to a voice encoder (vocoder). For example, a typical vocoder operating on a typical 64 kbit/sec source signal can convert the signal to a data rate of 2.4 kbit/sec, a coding gain of 27 times.

In the present invention, a complex audio information signal (combinations of speech and music) is applied to both a vocoder and a conventional fill range audio compression encoder, using an audio-type selection technique that examines the speech spectrum as well as the entire frequency spectrum and dynamic range of the audio information for subsequent selectable compression. To this end, the high coding gain speech vocoder is used to compress the speech signals and the full range encoder with a lower coding gain is used to compress the composite signal that includes speech, music and other non-speech signals. An audio-type detection circuit is used to measure the audio input signal and to decide if the signal is speech or non-speech. In one embodiment, the detection circuit monitors the speech frequency spectrum and measures the occurrence of pauses indicative of a speech signal. The detection circuit also measures the energy content outside the speech range of frequencies. A combination of the results of these measurements determines if the audio information is speech or non-speech. In an alternative embodiment, a vocoder monitors the incoming audio signals and produces a signal indicative of which type of audio signal is present. If the signal is speech the low data rate vocoder path is selected in response to a selection signal, and if it is non-speech the higher data rate compression encoder path is selected. In addition, an identification signal is generated to identify the type of audio data signal that is present.

The encoded composite audio signal is transmitted along with the identification signal, for reception by suitable receivers which include respective memories for storing the composite audio and identification signal for subsequent retrieval. Upon retrieval, the respective audio signals are separated and decoded in response to the identification signal, whereby the original speech and non-speech signals are made available to a listener in the form of an audible signal.

Another form of information signal suitable for conversion to audio is ASCII text which may be selected for transmission to data receivers along with the two other types of audio data signals and a unique identification signal. The identification signal comprises a code which identifies the type of signal selected, and is multiplexed with the digitized encoded audio information for transmission. The code subsequently directs the selection of the desired decoder in the data receivers.

A typical system for encoding, transmitting, receiving and decoding audio signals is described in the patent and applications of previous mention, that is, U.S. Pat. Nos. 5,406,626; 5,524,051; and 5,590,195, the descriptions of which are herein incorporated by reference in their entirety.

BRIEF DESCRIPTION OF THE DRAWINGS

FIGS. 4A–4H is a timing diagram illustrating the respective waveforms appearing at various inputs and outputs of the circuit components shown in FIG. 2.

DESCRIPTION OF THE PREFERRED EMBODIMENTS

Figure 1:
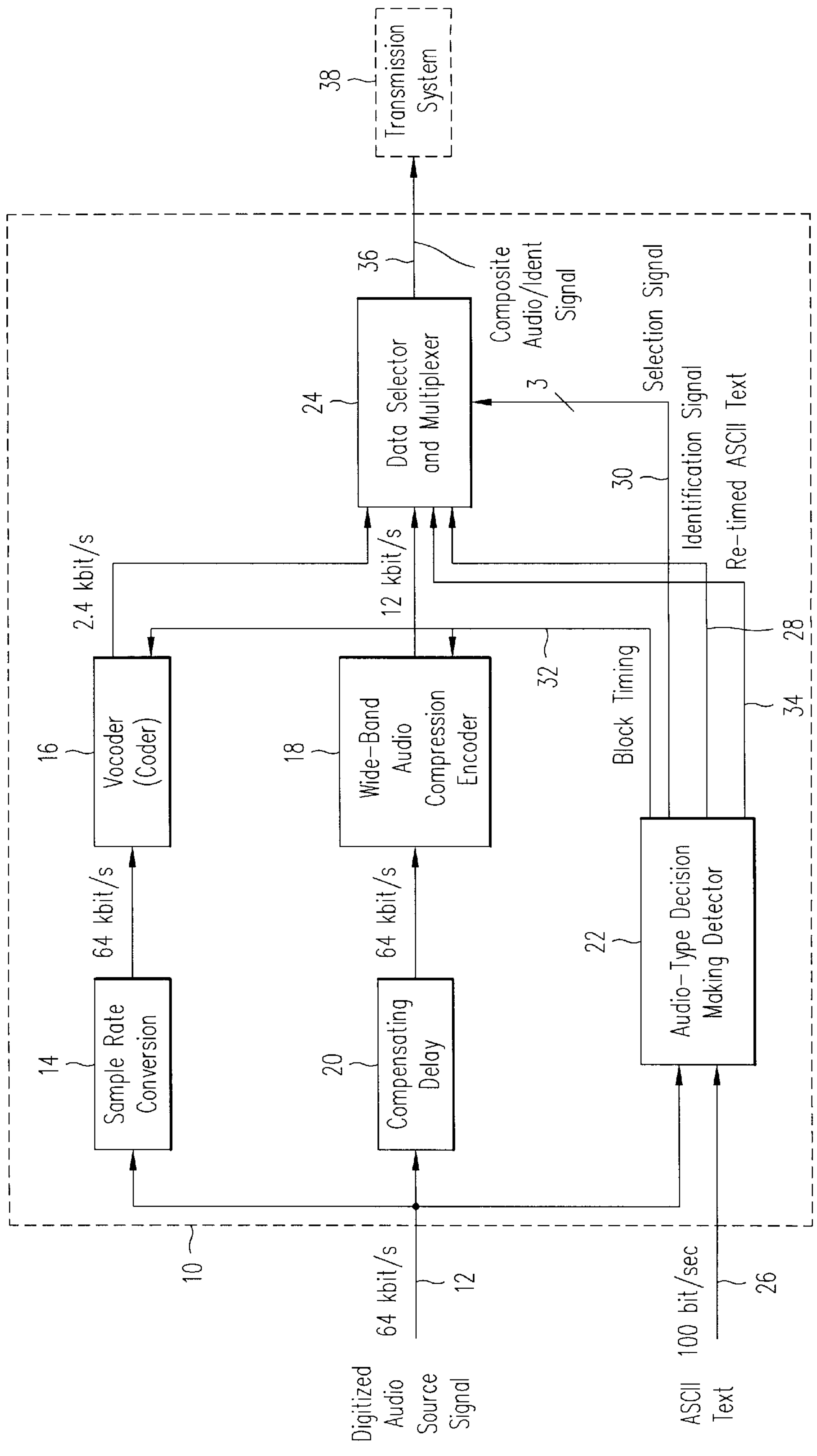
FIG. 1 is a block diagram illustrating an encoder system environment for encoding and transmitting audio information, in which the invention decision making detector means may be utilized.

FIG. 1 depicts an encoder system 10 which comprises the invention environment, wherein digitized audio information, hereinafter referred to as a digital audio source signal, is supplied on a lead 12 in either serial or parallel format and is sample rate converted by a sample rate converter circuit 14 to produce a 64 kbit/sec data signal. The data signal is applied to a vocoder 16. The sampling rate and dynamic range of the digital audio source signal on the input lead 12 to the encoder system will usually be greater than the 64 kbit/sec digitized audio signal required by the vocoder 16. Thus, prior to the vocoder 16 the signal is sample rate converted from the source rate to 64 kbit/sec via the sample rate converter circuit 14. Typical data rates for the encoder system 10 are shown in FIG. 1.

The vocoder 16 is of the type used in the telecommunications industry such as the voice codec IMBE™ manufactured by Digital Voice Systems, Inc., Burlington, Mass.

The audio source signal on lead 12 also is applied via a compensating delay 20 to a wide-band audio compression encoder 18 such as those used for transmitting entertainment programming in compressed form such as, for example, digital audio broadcast transmissions. Typical of a wide-band audio compression encoder is the Music cam encoder. The audio source signal 12 further is applied to an audio-type decision making detector 22 of the invention, further described in FIG. 2. The vocoder processing delay can be of the order of hundreds of milliseconds, hence the compensating delay 20 is inserted ahead of the audio compression encoder to maintain time coincidence at the outputs of the components 16, 18. The outputs of components 16, 18, 22 are in turn coupled to the inputs of a data selector/multiplexer 24.

The efficiency of a digital compression system is expressed as coding gain (CG) and is given by CG=input data rate/output data rate. A vocoder (such as 16) producing a 2.4 kbit/sec output for a 64 kbit/second input typically has a coding gain of 26.67. Audio compression encoders (such as 18) typically have coding gains of the order of 8 to 16 depending on the signal quality level desired.

A second input to the encoder system is a digital ASCII text signal on a lead 26 of the order of 100 bit/sec that, following transmission, is converted to pseudo audio information signals by a receiver such as described below in FIG. 3 using a method of a text-to-speech converter such as BeSTspeechÔ manufactured by Berkeley Speech Technologies of Berkeley, Calif. The ASCII text is treated as a separate audio information signal and is applied to a buffer at the input of the audio-type detector 22, further described in FIG. 2. Selection between digital audio source signal 12 and ASCII text signal 26 is performed as data from each source becomes available. The ASCII text signal is the third input to the digital data selector and multiplexer 24. Reading of the ASCII signal and inclusion in the data path uses conventional data processing techniques.

Selection between the vocoder 16 and the audio compression encoder 18 is made by the audio-type decision making detector 22 based on measurement of the incoming digital audio source signal as described below in FIG. 2. The precise timing of the selection between the encoders 16, 18 is initiated at common block boundaries of the two digital audio-type signals as further described below. The detector 22 provides an audio-type identification signal via a lead 28, a selection signal via a bus 30 and a re-timed ASCII text via a lead 34, to the data selector/multiplexer 24. A block timing signal is supplied via a lead 32 from the detector 22 to the vocoder 16 and encoder 18. Signal 32 controls the boundary timing of the blocks of data generated by the encoders 16, 18. The data selector/multiplexer 24 includes a multiplexing circuit for supplying an intermingled composite digital audio/identification output signal which includes the audio-type identification signal. The output signal is supplied via a lead 36 to a conventional transmission system (depicted at 38) for transmission in typical fashion to a decoder system of respective multiple audio receiver means, an example of which is further depicted in FIG. 3. The audio/identification output signal may be in parallel or serial digital format.

By way of operation in general, the decision making detector 22 of FIG. 1 looks at the energy in the frequency spectrum covering the range of speech of the audio source signal on bus 12, and measures the length, in time, of the typical pauses of silence occurring between syllables. The detector 22 further measures the energy content outside the voice range of frequencies. A combination of the results of the two detections determines if the audio is speech or is other non-speech sounds such as music. From this determination a selection signal is generated on bus 30 and is used to control the data selector/multiplexer 24 which intermingles the speech and non-speech signals into the composite audio output signal. The selection signal is formed of three timing signals on respective leads of the bus 30, as further described in FIG. 4. The intermingled selection signal first is re-timed via a re-timing latch (FIG. 2) to cause the switching between types of audio to occur at the phase synchronous block boundaries of the corresponding audio signals being encoded in the audio compression encoder 18 and vocoder 16.

The data identification signal is generated on the lead 28 and is unique to each type of audio signal, that is, speech, non-speech and ASCII, and is multiplexed with the selected audio signals via the data selector/multiplexer 24 to provide the composite audio/identification output signal on lead 36. The identification signal is used subsequently as a control signal for a complementary demultiplexer in the audio receiver means (FIG. 3).

Figure 2A:
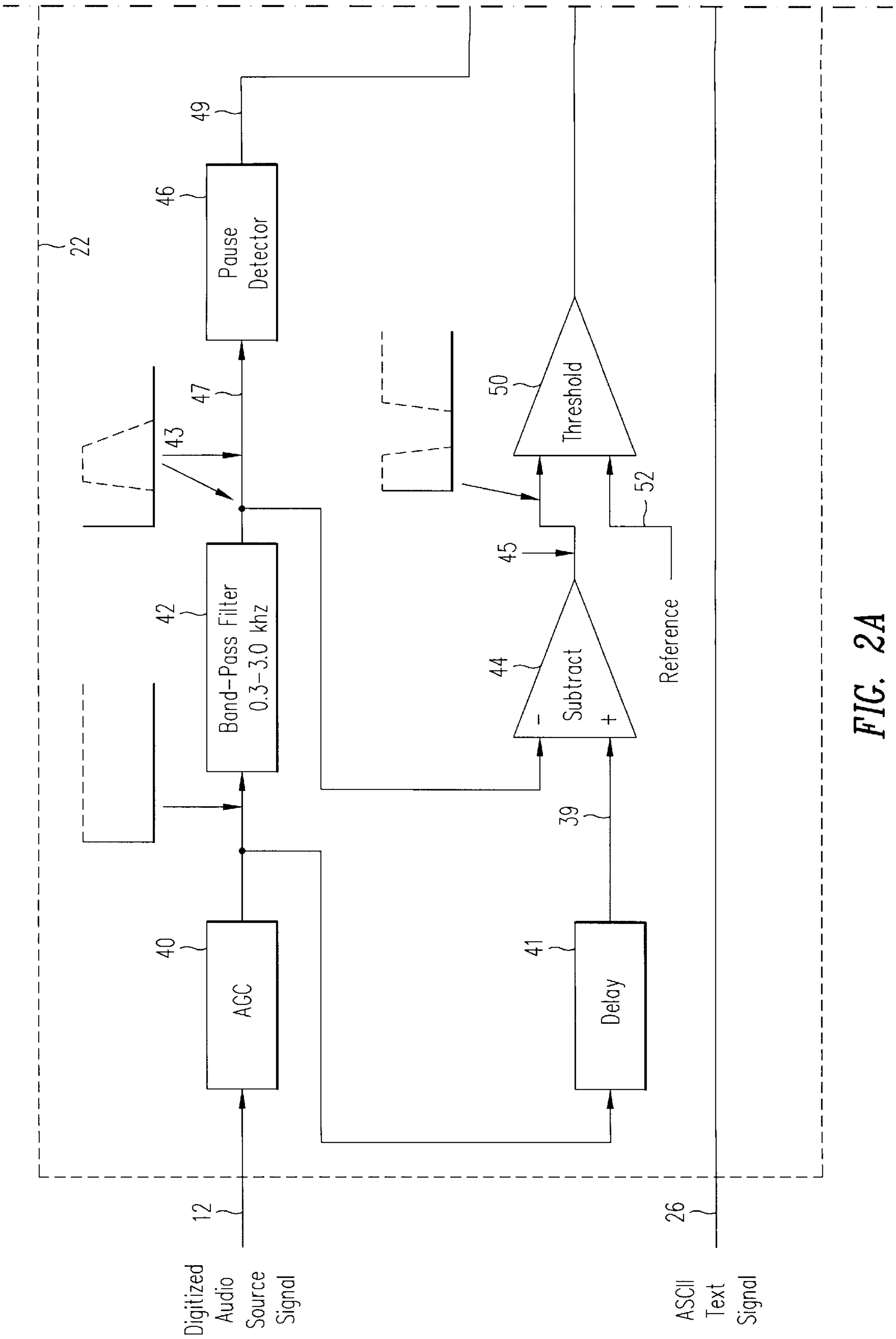
FIG. 2 is a block schematic diagram illustrating one embodiment of the decision making detector means of the present invention.
Figure 2B:
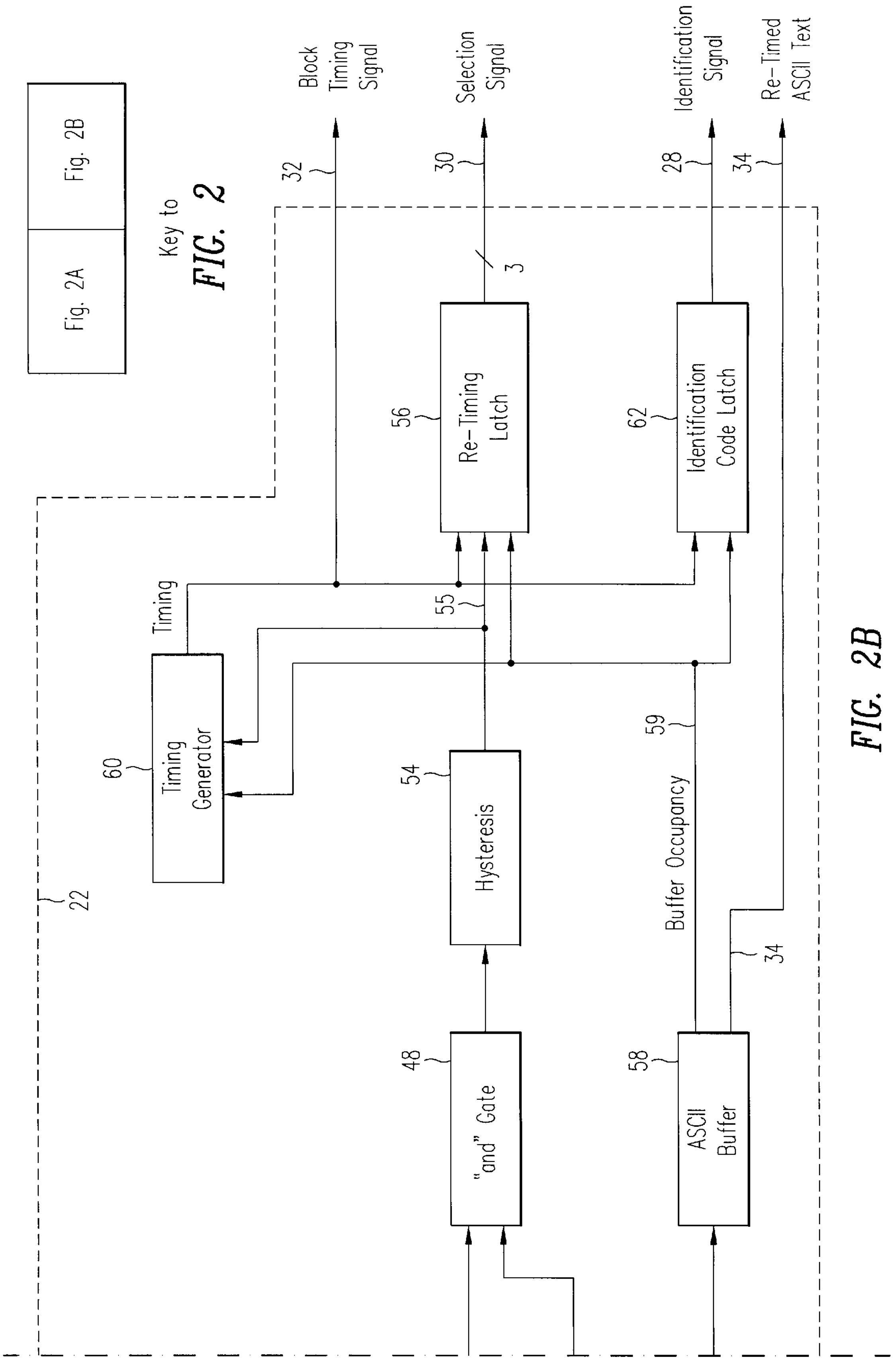

The encoder system of FIG. 1 also determines the time of insertion of ASCII text by examining the occupancy of an internal buffer memory in the ASCII data path, further described in FIG. 2. The selection signal from this measurement also is re-timed to occur on the block boundaries of the audio signals being processed in the encoders 16, 18. The combined selection signals operate the data selector/multiplexer 24 to provide the composite audio/identification output signal on the lead 36, which thus includes the identification signal on lead 28 multiplexed with the audio data. The ASCII text signal is re-timed by the re-timing latch of previous mention for inclusion with the other audio data in response to a buffer occupancy signal shown in FIG. 2.

Referring now to FIG. 2, the audio-type decision making detector 22 of the invention is shown in greater detail. The digitized audio source signal is supplied in either a serial or parallel format via the lead 12 to an automatic gain control circuit (AGC) 40, and thence to a band-pass filter (BPF) 42 of a first identification (ident) path 43. The audio source signal also is applied to a delay network 41 and thence to a non-inverting input of a subtractor circuit 44 of a second ident path 45. The delay network 41 compensates for the delay introduced by the band-pass filter 42 so that the signals appearing on leads 39 and 47, comprising the input signals to the subtractor circuit 44, are in time with each other. The output of the BPF 42 is supplied to a pause detector circuit 46 as well as to an inverting input of the subtractor circuit 44. The output of the pause detector circuit 46 is supplied to an AND gate 48 and the output of the subtractor circuit 44 is supplied to a threshold circuit 50 and thence to a second input of the AND gate 48. A reference signal which determines the operating threshold is coupled to the threshold circuit 50 via a lead 52. The logic output of the AND gate 48 is coupled to a hysteresis circuit 54 and thence via a lead 55 to a re-timing latch 56 as an initial selection signal. The output of the re-timing latch 56 is the selection signal of previous mention on bus 30. The output of the hysteresis circuit 54 also is supplied via the lead 55 to a timing generator 60 to re-time the selection process by making it occur at the common block boundaries of the compressed audio data signals. The re-timed selection signal appears on the bus 30.

The pause detector 46 looks for short pauses between bursts of data indicating typical speech. A pause is defined as a significant reduction in the instantaneous level of the audio signal with respect to the average audio level occurring for a period of 50 to 150 milliseconds and at a rate of 1 to 3 times per second. The precise timings are determined empirically and vary depending on the speed of the speech and the language spoken. If a string of pauses meeting the above or similar criteria is met over a period of time, the pause detector produces a logic one at its output, lead 49. If pauses are not detected, the output is a logic zero.

The ASCII text on lead 26 is supplied to an ASCII buffer 58 which supplies a buffer occupancy signal via a lead 59 to the timing generator 60, to the re-timing latch 56 and to an identification code latch 62 whose output is the identification signal of previous mention on the lead 28. The output of the buffer 58 is supplied on the lead 34 as the re-timed ASCII text signal of previous description. A timing signal from the timing generator 60 is the block timing signal on the lead 32, which also is supplied to the re-timing latch 56 and the identification code latch 62 as well as to the encoders 16, 18 of FIG. 1.

Regarding more particularly the operation of FIG. 2, the digitized audio source signal is applied to the AGC 40 to maintain a fixed output level for all audio input levels. Following the AGC, the audio is applied to the speech band-pass filter BPF 42 covering the frequency range from 300 Hz to 3 kHz, which represents the frequency band containing the maximum speech energy. Unlike other types of sounds, speech consists of syllables and pauses, whereby detection of the pauses is one indication of a speech signal. Accordingly, the pause detector circuit 46 provides a logic one output if a relatively large number of pauses are measured in a unit of time, indicating a speech signal. If the pause detector circuit 46 does not detect a given large number of pauses in the signal, the circuit 46 outputs a logic zero. The logic signal is applied as one input to the logic AND gate 48.

The band-pass signal from the BPF 42 is subtracted from the flat frequency response signal supplied by the AGC 40 via the subtractor circuit 44 to produce a non-speech signal representing frequency components outside the range of normal speech. This signal is applied to the threshold circuit 50 which produces a logic one output if the audio level is below a predetermined threshold set by the reference level on the lead 52. A logic zero output is produced if the audio level is greater than the threshold, indicating that the signal is a non-speech signal such as music. The logic signal from threshold circuit 50 is the second input to the AND function.

In accordance with the invention, if pauses are detected in the limited bandwidth signal of path 43 and sufficient energy is not present in the remaining range of frequencies, that is, in the non-speech signal in the path 45, the output of the AND gate 48 is a logic one, indicating a speech signal is present with no other sounds of significant level.

The truth table below illustrates in further detail the output states of the pause detector circuit 46, the threshold circuit 50, the AND gate 48 as well as the encoder selection, for possible combinations of input conditions.

| condition | pause detector 46 | threshold circuit 50 | AND gate 48 | selection |
|---|---|---|---|---|
| wide-band audio (non-speech/music) | X | 0 | 0 | audio compression encoder 18 |
| pauses in audio, wide-band audio present (non-speech/music) | 1 | 0 | 0 | audio compression encoder 18 |
| pauses in audio, narrow band audio present (speech) | 1 | 1 | 1 | vocoder 16 |
| no audio present, or very long pauses (no signal) | 1 | 1 | 1 | vocoder 16 |

Hysteresis is applied to the AND logic output signal by the circuit 54 to prevent the signal from toggling in the range of uncertainty. The logic signal further is re-timed by the re-timing latch 56 of previous mention to align it with the common block boundaries of the two types of encoded audio of the encoder outputs, in response to the timing generator 60.

The ASCII text information on the lead 26 is written to the ASCII buffer 58 and the buffer occupancy of the buffer 58 is constantly monitored. As the buffer reaches the full state the internal fullness measurement initiates a buffer nearly full signal and the buffer 58 supplies a pause signal, that is, the buffer occupancy signal, on lead 59 to the timing generator 60, to the re-timing latch 56 and to the identification code latch 62. The buffer is read out at a high data rate, relative to the ASCII input signal on lead 26. The audio encoders 16, 18 of FIG. 1 are instructed via the block timing signal 32 to store their converted audio data temporarily while the ASCII text data is transferred from the ASCII buffer 58 to the transmission path 34. When the ASCII buffer empties, the buffer fullness measurement function disables the ASCII read process and the encoders 16, 18 are enabled to continue outputting their respective audio signals to the data selector/multiplexer 24. The latter circuit 24 multiplexes the two audio signals of speech and non-speech into a composite audio signal in response to the selection signal on the bus 30. The identification signal on the lead 28 also is multiplexed into the composite audio signal to provide the composite audio/identification output signal on the lead 36 for transmission in conventional fashion via the transmission system indicated at 38.

FIGS. 4A–4H illustrate further the operation of the decision making detector 22 in the course of determining the type of audio information supplied on the input lead 12. To this end, when the ASCII buffer 58 is nearly full, the buffer occupancy signal on lead 59 goes to a high binary state as shown in FIG. 4A. The output 32 of the timing generator 60 supplies the block timing signal indicative of the boundaries of the blocks of data generated for the vocoder 16 and audio compression encoder 18, as shown in FIG. 4C. At the trailing edge of the transition of the block boundary signal following the buffer occupancy signal 59 (FIG. 4A), the ASCII buffer 58 is read using an internal read signal shown in FIG. 4B. During this period of time the data of both the vocoder 16 and audio compression encoder 18 are temporarily stored as depicted via the dimension line in FIG. 4C. The read and re-timed ASCII text information is depicted in FIG. 4D. When the buffer 58 empties, the buffer occupancy signal on lead 59 transitions to a low state as shown in FIG. 4A.

The timing signal indicative of the selection of speech (vocoder 16) or non-speech (encoder 18) is supplied to the re-timing latch 56 from the hysteresis circuit 54 via the lead 55, and is shown in FIG. 4E. The latch 56 also receives the occupancy signal on lead 59 which indicates the selection of ASCII text (FIG. 4A). The third input to the re-timing latch 56 is the block timing signal on lead 32 which indicates the boundaries of the audio-type signals and the type of signal to be selected, that is, speech or non-speech. The signal 32 is depicted in FIG. 4F which corresponds to the waveform of FIG. 4C. The output of the re-timing latch 56 comprises the selection signal on the bus 30 which includes three timing signals shown in FIGURE G1, G2, G3.

Signal G1 of the selection signal indicates the time for selection of the identification code signal on lead 28 by the data selector/multiplexer 24. Signal G2 indicates the time for the selection of the speech signal from the vocoder 16, or the non-speech signal from the audio compression encoder 18. Signal G3 indicates the time for the selection of the ASCII text by the data selector/multiplexer 24.

The identification code latch 62 receives the block timing signal on lead 32 indicating block boundaries and vocoder 16 or audio compression encoder 18 modes, and the buffer occupancy signal on lead 59 indicating the selection of ASCII text information. The identification code signal from the latch 62 on lead 28 is multiplexed with the data via the data selector/multiplexer 24 in response to the signal G1, as previously described. The coded identification signal is depicted in FIG. 4H and is timed to occur within the corresponding time periods of the block timing signal on lead 32 of FIG. 4C and 4F.

Figure 3:
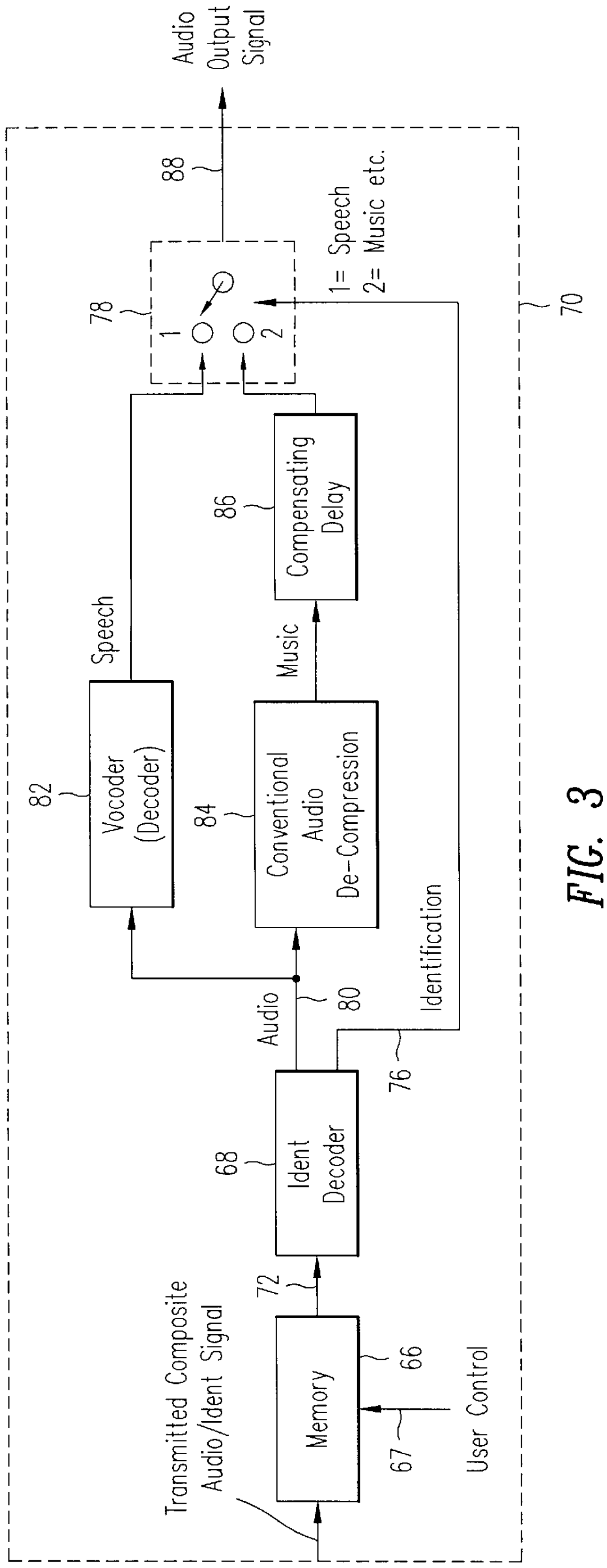
FIG. 3 is a block diagram illustrating a decoder system environment for receiving the encoded and transmitted audio information in accordance with the decoding means of the invention.

Referring now to FIG. 3, the transmitted composite audio/identification signal is supplied to a memory 66 integral with a decoder system 70 of the receiver means of previous mention. The stored audio then may be recovered when desired by a user in response to a user control signal on a lead 67. The recovered audio and identification signals are supplied via a lead 72 to an identification decoder 68 of the decoder system 70. The memory 66 and decoder system 70 comprise the receiver means for receiving and utilizing a restored version of the digital audio source signal originally supplied to the encoder system 10 of FIGS. 1, 2. Such a receiver means is discussed in the patents of previous reference. The identification decoder 68 searches for and separates the identification signal from the composite audio/identification signal. The identification signal as previously discussed indicates, in time, when a change occurs in the type of audio signal. The identification decoder 68 detects the unique codes that identify the type of audio data received by the input 72 from the memory 66. The decoded identification signal is supplied via a lead 76 to a cross-fade switch 78 as a control signal. The composite audio signal is supplied via a lead 80 to a vocoder decoder 82 and also to a wide-band audio decompression decoder 84. The vocoder decoder 82 extracts the speech signal from the composite audio signal and supplies it to a speech input of the cross-fade switch 78. The wide-band decoder 84 extracts the non-speech signal from the composite audio signal and supplies it to a non-speech input of the switch 78 via a compensating delay 86, which compensates for the decoder 82 signal processing time. The cross-fade switch 78 generally is conventional in function and, in response to the controlling identification signal on lead 76, provides a soft switching of the speech and non-speech signals to produce a resulting smoothly intermingled digital audio output signal on an output bus 88. The audio output signal corresponds to the digital audio source signal originally supplied via the bus 12 to the encoder system 10 of FIGS. 1, 2. The digital audio signal on output bus 88 is converted to analog format whereby the audio information may be transduced via a conventional amplifier/speaker system (not shown) into a signal for aural presentation to a listener.

Although the invention has been described herein relative to specific embodiments, various additional features and advantages will be apparent from the description and drawings. For example, a vocoder (that is, vocoder 16) also may be used to detect the presence of speech or non-speech signals as an alternate to a corresponding portion of the audio-type decision making detector 22. The vocoder measures the frequency components of speech usually using a fast fourier transform or other frequency selective transform. If the vocoder produces an accurate electrical representation of the incoming signal with the normal speech bandwidth as evidenced by comparing the reconstructed voice coded signal with the input signal in the frequency domain, then a safe assumption can be made that the input signal in question is a voice coded signal. If the comparison shows significant differences exist between the two compared signals, then a safe assumption can be made that the signal is a non-speech or music signal. The resulting signal of such a comparison may be applied to the hysteresis function, 54 of FIG. 2 in place of the components 40–48 of the decision making detector 22.

Figure 5:
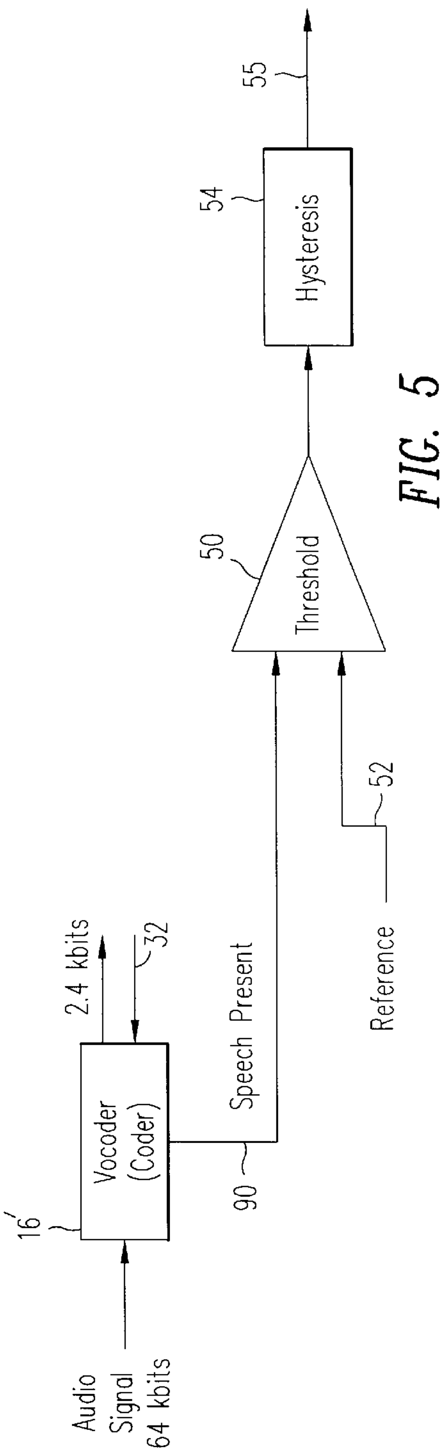
FIG. 5 is a block diagram illustrating an alternative embodiment of the decision making detector means of the invention.

FIG. 5 depicts the use of a vocoder 16' as the alternative of previous mention for making the audio-type decision indicative of whether the audio signal is speech or non-speech. To this end, the sample rate converted audio signals of 64 kbits are supplied to the vocoder 16' which then provides an output on a lead 90 indicative of the accuracy of the incoming signal relative to the normal speech bandwidth, and thus indicative of whether a speech signal is present. The output on lead 90 is compared with the threshold reference level on lead 52 via the threshold circuit 50. The threshold circuit provides the selection signal on lead 55 as a logic one if the audio level is below the threshold level indicating a speech signal. A logic zero output is provided if the audio level is greater than the threshold level providing a selection signal on lead 55 indicating a non-speech signal.

Thus the scope of the invention is intended to be defined by the following claims and their equivalents.

What is claimed is:

1. Apparatus for encoding digital audio information formed of audio signals including speech signals and non-speech signals, comprising:

means for generating a selection signal indicative of the speech signal and the non-speech signal;

means for separately encoding the speech and non-speech signals present in the audio information with optimum compression based on the energy contents of the signals;

means responsive to the selection signal for providing an identification signal indicative of the audio signals for inclusion with selected audio signals; and means for intermingling the encoded speech signal, and the encoded non-speech signal and the identification signal in response to the selection signal.

2. The apparatus of claim 1 wherein the generating means includes:

means for detecting whether the information is a speech signal or a non-speech signal; and the generating means being responsive to the detecting means.

3. The apparatus of claim 2 wherein the detecting means includes:

first means for generating a first signal indicative of a speech signal;

second means for generating a second signal indicative of a non-speech signal; and logic for generating the selection signal in response to the first and second signals.

4. The apparatus of claim 3 wherein the first signal is representative of a preselected ratio of pauses in the audio information to indicate the speech signal.

5. The apparatus of claim 3 wherein the first means includes:

a filter for passing a passband signal in a frequency range which contains maximum speech energy; and a pause detector responsive to the filter for generating the first signal indicative of an occurrence of successive pauses in the audio information.

6. Apparatus for encoding digital audio information formed of audio signals including speech signals and non-speech signals, comprising:

means responsive to a selection signal for providing an identification signal indicative of the audio signals for inclusion with selected audio signals;

means for intermingling the speech signal, the non-speech signal, and the identification signal in response to the selection signal;

first means for generating a first signal indicative of a speech signal;

logic for generating the selection signal in response to the first signal and a second signal;

a filter for passing a passband signal in a frequency range which contains maximum speech energy;

means responsive to the passband signal and the audio information for providing a third signal representing a level of frequency components outside a range of the speech signal; and means responsive to the third signal and to a predetermined threshold level for producing the second signal indicative of a level of energy in the third signal.

7. The apparatus of claim 6 wherein the producing means includes an audio level threshold circuit for comparing the third signal with the predetermined threshold level.

8. The apparatus of claim 6 wherein the logic includes AND logic responsive to logic states of the first signal and the second signal, for generating said selection signal.

9. The apparatus of claim 6 further including a voice encoder for encoding the speech signal:

wherein the voice encoder is selected by the means for intermingling when the selection signal indicates speech.

10. The apparatus of claim 6 further including a wide-band audio compression encoder for encoding the non-speech signal:

wherein the wide-band encoder is selected by the means for intermingling when the selection signal indicates non-speech.

11. Apparatus for encoding digital audio information formed of audio signals including speech signals and non-speech signals, comprising:

means for generating a selection signal indicative of the speech signal and the non-speech signal;

means responsive to the selection signal for providing an identification signal indicative of the audio signals for inclusion with selected audio signals;

means for intermingling encoded speech signal, the encoded non-speech signal, and the identification signal in response to the selection signal;

a voice encoder for encoding the speech signal; and a wide-band audio compression encoder for encoding the non-speech signal.

12. Apparatus for encoding digital audio information formed of audio signals including speech signals and non-speech signals, comprising:

means for generating a selection signal indicative of the speech signal and the non-speech signal;

means responsive to the selection signal for providing an identification signal indicative of the audio signals for inclusion with selected audio signals;

means for intermingling the speech signal, the non-speech signal, and the identification signal in response to the selection signal;

a timing generator means responsive to the selection signal for synchronizing the identification signal with the occurrence of the audio signals; and a latch responsive to the timing generator means for providing the identification signal.

13. The apparatus of claim 12, wherein the audio signals include an ASCII text signal, and further including:

a buffer for selectively supplying the ASCII text signal; and the timing generator means being responsive to the buffer for storing the speech and non-speech signals in response to the buffer supplying the ASCII text signal.

14. Apparatus for encoding digital audio information formed of audio signals including speech signals and non-speech signals, comprising:

means responsive to a selection signal for providing an identification signal indicative of the audio signals for inclusion with selected audio signals; and means for intermingling the speech signal, the non-speech signal, and the identification signal in response to the selection signal;

a voice encoder for receiving and compressing the audio signals;

means for generating reconstructed voice coded signals from the compressed audio signals;

means for comparing the accuracy of the reconstructed voice coded signals with the audio signals; and means for generating the selection signal indicative of a speech signal in response to an accurate comparison between the reconstructed audio signals and the audio signals and for generating a selection signal indicative of a non-speech signal in response to a significant inaccuracy in the comparison.

15. The apparatus of claim 14 wherein the means for comparing further includes a threshold circuit.

16. Apparatus for reducing the transmission data rate of digital audio information formed of speech signals and non-speech signals, comprising:

means for detecting whether the information is a speech or a non-speech signal and for generating a selection signal indicative thereof;

means for separately encoding the speech and non-speech signals with respective optimum compression based on the information energy content of the signals;

means responsive to the detecting and generating means for producing a signal identifying the speech signal and the non-speech signal; and means for intermingling the encoded speech signal and the encoded non-speech signal in response to the selection signal, for transmission at said reduced data rate.

17. The apparatus of claim 16 wherein the detecting means includes:

means for generating a first signal indicative of the occurrence of a large number of pauses in a unit of time in a selected frequency range of the audio information corresponding to a speech signal; and means for generating a second signal indicative of audio frequency components outside the selected frequency range corresponding to a non-speech signal.

18. The apparatus of claim 17 wherein the means for generating a selection signal includes:

logic for producing in response to the first and second signals a logic state identifying the presence of a speech signal or a non-speech signal.

19. The apparatus of claim 17 wherein the first signal generating means includes:

a filter for providing a passband signal of said selected frequency range; and a pause detector responsive to the passband signal for generating a logic state corresponding to said first signal.

20. The apparatus of claim 19 wherein:

the filter provides a passband in a frequency range of maximum speech energy; and the logic is an AND gate.

21. The apparatus of claim 17 wherein the second signal generating means includes:

means responsive to a passband signal of said selected frequency range and the audio information for providing a third signal representing a level of audio frequency components outside the selected frequency range; and means responsive to the third signal for providing a logic state corresponding to said second signal.

22. The apparatus of claim 21 wherein:

the means for providing a third signal is a subtractor for subtracting the passband signal from the audio information; and the means for providing a logic state includes a threshold input of a selected audio level for comparison to the third signal.

23. The apparatus of claim 16 wherein:

the encoding means includes a voice coder for encoding the speech signal and a wide-band audio compression encoder for encoding the non-speech signal; and the intermingling means includes a selector/multiplexer circuit for selecting the encoded speech signal, the encoded non-speech signal or the identifying signal in response to the selection signal.

24. The apparatus of claim 16 including:

means for transmitting the intermingled encoded speech and non-speech signals selected by the means for intermingling along with the identifying signal; and a receiver receiving the transmitted encoded speech and non-speech signals for selectively decoding in response to the identifying signal the transmitted encoded speech and non-speech signals into a reassembled audio signal corresponding to the digital audio information, for audible presentation.

25. The apparatus of claim 24 wherein the receiver includes:

a memory for storing the transmitted signals;

means coupled to the memory for separating the identifying signal from the encoded speech and non-speech signals;

a decoder for separately decoding each of the encoded speech and non-speech signals; and a switch for selecting the decoded speech or non-speech signal in response to the separated identifying signal to form the reassembled audio signal for audible presentation.

26. Apparatus for decoding digital audio information formed of signals such as speech signals and non-speech signals, the audio information including a signal identifying the speech and non-speech signals, comprising:

means for receiving combined speech, non-speech and identifying signals;

means for separating the identifying signal from the speech and non-speech signals; and a decoder for separately decoding the speech and non-speech signals into a reassembled audio signal in response to the identifying signal, for audible presentation of the reassembled audio.

27. The apparatus of claim 26 wherein the means for separating includes:

a decoder circuit for detecting the identifying signal and extracting it from the combined signals.

28. The apparatus of claim 26 wherein the means for receiving includes:

means for storing the combined speech, non-speech and identifying signals; and means for retrieving the stored signals.

29. Apparatus for encoding digital audio information formed of audio signals such as speech signals and non-speech signals, comprising:

a generator which provides a selection signal indicative of the speech signal and the non-speech signal;

an encoder that separately encodes the speech and non-speech signals present in the audio information with optimum compression based on the information energy content of the signals;

a circuit responsive to the selection signal that provides an identification signal indicative of the audio signals for inclusion with selected audio signals; and a multiplexer coupled to receive the encoded speech signal, the encoded non-speech signal, and the identification signal that intermingles the encoded speech signal, the encoded non-speech signal and the identification signal in response to the selection signal.

30. The apparatus of claim 29 wherein the generator includes:

a detector that detects whether the information is a speech signal or a non-speech signal; and the generator being responsive to the detector.

31. The apparatus of claim 30 wherein the detector includes:

a first circuit that generates a first signal indicative of a speech signal;

a second circuit that generates a second signal indicative of a non-speech signal; and a logic coupled to receive the first and second signals that generates the selection signal in response to the first and second signals.

32. The apparatus of claim 31 wherein the first signal is representative of a preselected ratio of pauses in the audio information to indicate the speech signal.

33. The apparatus of claim 31 where the first circuit includes:

a filter that passes a passband signal in a frequency range which contains the maximum speech energy; and a pause detector responsive to the filter that generates the first signal indicative of an occurrence of successive pauses in the audio information.

34. Apparatus for encoding digital audio information formed of audio signals including speech signals and non-speech signals, comprising:

a generator coupled to receive first and second signals that generates a selection signal indicative of speech and non-speech signals;

a circuit responsive to the selection signal that provides an identification signal indicative of the audio signals for inclusion with selected audio signals;

a multiplexer coupled to receive the speech signal, the non-speech signal, and the identification signal that intermingles the speech signal, the non-speech signal, and the identification signal in response to the selection signal;

a first circuit that generates the first signal indicative of a speech signal;

a filter that passes a passband signal in a frequency range which contains maximum speech energy;

a third circuit responsive to the passband signal and the audio information that provides a third signal representing a level of frequency components outside the range of the speech signal; and a logic responsive to the third signal and to a predetermined threshold level for producing the second signal indicative of the level of energy in the third signal.

35. The apparatus of claim 34 wherein the logic further includes an audio level threshold circuit that compares the third signal with the predetermined threshold level.

36. The apparatus of claim 34 wherein the generator further includes AND logic responsive to logic states of the first signal and the second signal for generating the selection signal.

37. The apparatus of claim 34 further including a voice encoder that encodes the speech signal;

wherein the voice encoder is selected by the multiplexer where the selection signal indicates a speech signal.

38. The apparatus of claim 34 further including a wide-band audio compression encoder that encodes the non-speech signal;

wherein the wide-band encoder is selected by the multiplexer where the selection signal indicates a non-speech signal.

39. Apparatus for encoding digital audio information formed of audio signals such as speech signals and non-speech signals, comprising:

a generator which provides a selection signal indicative of the speech signal and the non-speech signal;

a circuit responsive to the selection signal that provides an identification signal indicative of the audio signals for inclusion with selected audio signals;

a multiplexer coupled to receive an encoded speech signal, an encoded non-speech signal, and the identification signal that intermingles the encoded speech signal, the encoded non-speech signal, and the identification signal in response to the selection signal;

a voice encoder that encodes the speech signal;

a wide-band audio compression encoder that encodes the non-speech signal.

40. Apparatus for encoding digital audio information formed of audio signals such as speech signals and non-speech signals, comprising:

a generator which provides a selection signal indicative of the speech signal and the non-speech signal;

a circuit responsive to the selection signal that provides an identification signal indicative of the audio signals for inclusion with selected audio signals;

a multiplexer coupled to receive the speech signal, the non-speech signal, and the identification signal that intermingles the speech signal, the non-speech signal, and the identification signal in response to the selection signal;

a timing generator that synchronizes the identification signal with the occurrence of the speech and non-speech signals; and a latch responsive to the timing generator that provides the identification signal.

41. The apparatus of claim 40 wherein the audio signals include an ASCII text signal, including:

a buffer that selectively supplies the ASCII text signal to the multiplexer; and the timing generator is responsive to a buffer for storing the speech and non-speech signals in response to the buffer supplying the ASCII text signal.

42. Apparatus for encoding digital audio information formed of audio signals such as speech signals and non-speech signals, comprising:

a circuit responsive to a selection signal that provides an identification signal indicative of the audio signals for inclusion with selected audio signals:

a multiplexer coupled to receive the speech signal, the non-speech signal, and the identification signal that intermingles the speech signal, the non-speech signal, and the identification signal in response to a selection signal;

a voice encoder that receives and compresses the audio signals;

a comparator that compares the accuracy of reconstructed voice coded signals generated from the compressed audio signals with the audio signals; and a generator that generates the selection signal indicative of a speech signal in response to an accurate comparison between the reconstructed audio signals and the audio signals and that generates the selection signal indicative of a non-speech signal in response to a significant inaccuracy in the comparison.

43. The apparatus of claim 42 wherein the comparator includes a threshold circuit.

44. Method for encoding digital audio information formed of audio signals including speech signals and non-speech signals, comprising the steps:

generating a selection signal indicative of the speech signal and the non-speech signal;

separately encoding the speech and non-speech signals present in the audio information with optimum compression based on the energy contents of the signals;

providing an identification signal indicative of the audio signals for inclusion with selected audio signals in response to the selection signal; and intermingling the encoded speech signal, the encoded non-speech signal, and the identification signal in response to the selection signal.

45. The method of claim 44 wherein the generating step further includes the step of:

detecting whether the information is a speech signal or a non-speech signal.

46. The method of claim 45 wherein the generating step further includes the steps of:

generating a first signal indicative of the speech signal;

generating a second signal indicative of the non-speech signal; and generating the selection signal in response to the first and second signals.

47. The method of claim 46 wherein the step of generating the first signal further includes the steps of:

filtering out signals except a passband signal in a frequency range which contains maximum speech energy;

detecting pauses in the passband signal; and generating the first signal indicative of speech where there is an occurrence of successive pauses in the audio information.

48. Method for encoding digital audio information formed of audio signals including speech signals and non-speech signals, comprising the steps of:

generating a first signal indicative of the speech signal;

filtering out signals except a passband signal in a frequency range which contains maximum speech energy;

providing a third signal responsive to the passband signal and the audio information representing a level of frequency components outside the range of the speech signal;

generating a second signal responsive to the third signal indicative of the non-speech signal;

generating a selection signal indicative of the speech signal and the non-speech signal in response to the first and second signals;

separately encoding the speech and non-speech signals present in the audio information with optimum compression based on the energy contents of the signals;

providing an identification signal indicative of the audio signals for inclusion with selected audio signals in response to the selection signal; and intermingling the encoded speech signal, the encoded non-speech signal, and the identification signal in response to the selection signal.

49. The method of claim 48 wherein the step of generating a second signal further includes the steps of:

comparing the third signal with a predetermined threshold level; and generating the second signal as indicating non-speech where the third signal exceeds the predetermined threshold level.

50. The method of claim 48 wherein the step of generating a selection signal further includes the steps of:

generating a selection signal indicative of non-speech where the second signal indicates non-speech; or generating a selection signal indicative of speech where the first signal indicates speech and the second signal does not indicate non-speech.

51. The method of claim 48 wherein the step of separately encoding further includes the steps of:

voice encoding the speech signal; and wide-band compression encoding the non-speech signal.

52. The method of claim 51 wherein the step of intermingling further includes:

selecting the voice encoded signal when the selection signal indicates the speech signal; or selecting the wide-band compression encoded signal when the selection signal indicates the non-speech signal.

53. Method for encoding digital audio information formed of audio signals including speech signals and non-speech signals, the steps comprising:

generating a selection signal indicative of the speech signal and the non-speech signal;

voice encoding the speech signal;

wide-band compression encoding the non-speech signal;

providing an identification signal indicative of the audio signals for inclusion with selected audio signals in response to the selection signal; and intermingling the encoded speech signal, the encoded non-speech signal, and the identification signal in response to the selection signal.

54. Method for encoding digital audio information formed of audio signals including speech signals and non-speech signals, the steps comprising:

generating a selection signal indicative of the speech signal and the non-speech signal;

providing an identification signal indicative of the audio signals for inclusion with selected audio signals in response to the selection signal;

generating a timing signal responsive to the selection signal for synchronizing the identification signal with the speech and non-speech signals;

synchronizing the identification signal with the speech and non-speech signals by use of a latch responsive to the timing signal; and intermingling the speech signal, the non-speech signal, and the identification signal in response to the selection signal.

55. The method of claim 54, wherein the speech and non-speech signals include an ASCII text signal, and further including the steps:

storing the ASCII text signal in a buffer;

storing the speech and non-speech signals when the ASCII text is supplied for use in the intermingling step; and supplying the speech and non-speech signals for use in the intermingling step after the ASCII text has been supplied.

56. Method for encoding digital audio information formed of audio signals including speech signals and non-speech signals, the steps comprising:

voice encoding the audio signals;

reconstructing audio signals from the voice encoded audio signals;

comparing the accuracy of the reconstructed audio signals with the audio signals;

generating a selection signal indicative of a speech signal in response to an accurate reproduction of the audio signals; or generating a selection signal indicative of a non-speech signal in response to an inaccurate reproduction of the audio signals;

providing an identification signal indicative of the audio signals for inclusion with selected audio signals in response to the selection signal; and intermingling the speech signal, the non-speech signal, and the identification signal in response to the selection signal.

57. The method of claim 56 wherein the step of comparing further includes the step of comparing the difference between the reconstructed audio signal and the audio signal with a selected threshold level.

58. Apparatus for reducing the transmission data rate of digital audio information formed of speech signals and non-speech signals, comprising:

a detector coupled to receive the audio information that detects whether the information is a speech or a non-speech signal and generates a selection signal indicative thereof;

an encoder coupled to receive the speech and non-speech signals that separately encodes the speech and non-speech signals with respective optimum compression based on the information energy content of the signals;

an identifier which is responsive to the selection signal that produces a signal identifying the presence of the speech signal and the non-speech signal in the audio information; and a multiplexer coupled to receive the encoded speech and non-speech signals that intermingles the encoded speech signal and the encoded non-speech signal in response to the selection signal, for transmission at said reduced data rate.

59. The apparatus of claim 58 wherein the detector includes:

a first signal generator that generates a first signal indicative of a large number of pauses in a unit of time in a selected frequency range of the audio information corresponding to the speech signal; and a second signal generator that generates a second signal indicative of audio frequency components present outside the selected frequency range corresponding to the non-speech signal.

60. The apparatus of claim 59 wherein the detector includes:

a logic coupled to receive the first and second signals that produces a logic state identifying the speech signal or non-speech signal.

61. The apparatus of claim 59 wherein the first signal generator includes:

a filter that provides a passband signal of said selected frequency range; and a pause detector coupled to receive the passband signal that generates the first signal indicative of the presence of speech where there is an occurrence of successive pauses in the audio information.

62. The apparatus of claim 61 wherein:

the filter provides a passband in a frequency range of maximum speech energy.

63. The apparatus of claim 59 wherein the second signal generator includes:

a third signal generator coupled to receive a passband signal of said selected frequency range and the audio information that provides a third signal representing the level of audio frequency components outside the selected frequency range; and a threshold circuit coupled to receive the third signal that provides a logic state corresponding to said second signal.

64. The apparatus of claim 63 wherein:

the third signal generator is a subtractor that subtracts the passband signal from the audio information; and the threshold circuit includes an input of a selected audio level for comparison to the third signal.

65. The apparatus of claim 58 wherein:

the encoder includes a voice coder that encodes the speech signal and a wide-band audio compression encoder that encodes the non-speech signal; and the multiplexer includes a selector/multiplexer circuit that selects the encoded speech signal, the encoded non-speech signal, or the identifying signal in response to the selection signal.

66. The apparatus of claim 58 including:

a transmitter that transmits intermingled encoded speech and non-speech signals selected by the multiplexer along with the identifying signal; and a receiver that receives the transmitted encoded speech and non-speech signals and restores the encoded speech and non-speech signals into a reassembled audio signal corresponding to the digital audio information, for audible presentation.

67. The apparatus of claim 66 wherein the receiver includes:

a memory that stores transmitted signals;

an identification signal decoder coupled to the memory that separates the identifying signal from the encoded speech and non-speech signals;

a decoder coupled to receive the encoded speech and non-speech signals that separately decodes each of the encoded speech and non-speech signals; and a switch coupled to receive the decoded speech and non-speech signals that selects the decoded speech or the non-speech signal in response to the separated identifying signal to form the reassembled audio signal for audible presentation.

68. Method of decoding digital audio information formed of speech signals and non-speech signals, the audio information including a signal identifying the speech and non-speech signals, the steps including:

receiving combined speech and non-speech signals and the identifying signal;

separating the identifying signal from the speech and non-speech signals; and intermingling the speech and non-speech signals into a reassembled audio signal in response to the identifying signal, for audible presentation of the reassembled audio.

69. The method of claim 68 wherein the step of separating further includes the step:

detecting the identifying signal and extracting it from the combined signals.

70. The method of claim 68 wherein the step of receiving further includes the step:

storing the combined speech, non-speech, and identifying signals; and retrieving the stored signals.

71. Apparatus for decoding digital audio information formed of signals such as speech signals and non-speech signals, the audio information including a signal identifying the speech and non-speech signals, comprising:

a receiver that receives combined speech, non-speech and identifying signals;

an identification signal decoder coupled to receive the combined speech, non-speech and identifying signals which separates the identifying signal; and a switch coupled to receive the speech and non-speech signals that reassembles the speech and non-speech signals in response to the identifying signal into an audio signal, for audible presentation.

72. The apparatus of claim 71 wherein the identification signal decoder further includes:

an extractor that detects the identifying signal and extracts it from the combined speech, non-speech and identifying signals.

73. The apparatus of claim 71 wherein the receiver further includes:

a storage circuit coupled to receive the combined speech, non-speech, and identifying signals for storing the combined speech, non-speech, and identifying signals; and a retriever circuit for retrieving the stored signals.

74. Apparatus for encoding digital audio information formed of audio signals such as speech signals and music signals, comprising:

a generator which provides a selection signal indicative of the speech signal and the music signal;

a circuit responsive to the selection signal that provides an identification signal indicative of the audio signals for inclusion with selected audio signals; and a multiplexer coupled to receive the speech signal, the music signal, and the identification signal that intermingles the speech signal, the music signal and the identification signal in response to the selection signal.

75. The apparatus of claim 74 wherein the generator includes:

a detector that detects whether the information is a speech signal or a music signal; and the generator being responsive to the detector.

76. The apparatus of claim 75 wherein the detector includes:

a first circuit that generates a first signal indicative of a speech signal;

a second circuit that generates a second signal indicative of a music signal; and a logic coupled to receive the first and second signals that generates the selection signal in response to the first and second signals.

77. The apparatus of claim 76 wherein the first signal is representative of a preselected ratio of pauses in the audio information to indicate the speech signal.

78. The apparatus of claim 76 where the first circuit includes:

a filter that passes a passband signal in a frequency range which contains the maximum speech energy; and a pause detector responsive to the filter that generates the first signal indicative of an occurrence of successive pauses in the audio information.

79. The apparatus of claim 76 wherein the second circuit includes:

a third circuit responsive to a passband signal in a frequency range which contains the maximum speech energy and the audio information that provides a third signal representing a level of frequency components outside the range of the speech signal; and a logic responsive to the third signal and to a predetermined threshold level for producing the second signal indicative of the level of energy in the third signal.

80. The apparatus of claim 79 wherein the logic further includes an audio level threshold circuit that compares the third signal with the predetermined threshold level.

81. The apparatus of claim 76 wherein the generator further includes AND logic responsive to logic states of the first signal and the second signal for generating the selection signal.

82. The apparatus of claim 74 further including a voice encoder that encodes the speech signal;

wherein the voice encoder is selected by the multiplexer where the selection signal indicates a speech signal.

83. The apparatus of claim 74 further including a wide-band audio compression encoder that encodes the music signal;

wherein the wide-band encoder is selected by the multiplexer where the selection signal indicates a music signal.

84. The apparatus of claim 74 further including:

a voice encoder that encodes the speech signal;

a wide-band audio compression encoder that encodes the music signal.

85. The apparatus of claim 74 wherein the circuit responsive to the selection signal includes:

a timing generator that synchronizes the identification signal with the occurrence of the speech and music signals; and a latch responsive to the timing generator that provides the identification signal.

86. The apparatus of claim 85 wherein the audio signals include an ASCII text signal, including:

a buffer that selectively supplies the ASCII text signal to the multiplexer; and the timing generator is responsive to a buffer for storing the speech and music signals in response to the buffer supplying the ASCII text signal.

87. The apparatus of claim 74 wherein the detector means includes:

a voice encoder that receives and compresses the audio signals;

a comparator that compares the accuracy of reconstructed voice coded signals generated from the compressed audio signals with the audio signals; and a generator that generates the selection signal indicative of a speech signal in response to an accurate comparison between the reconstructed audio signals and the audio signals and that generates the selection signal indicative of a music signal in response to a significant inaccuracy in the comparison.

88. The apparatus of claim 87 wherein the comparator includes a threshold circuit.

89. Method for encoding digital audio information formed of audio signals including speech signals and music signals, comprising the steps:

generating a selection signal indicative of the speech signal and the music signal;

providing an identification signal indicative of the audio signals for inclusion with selected audio signals in response to the selection signal; and intermingling the speech signal, the music signal, and the identification signal in response to the selection signal.

90. The method of claim 89 wherein the generating step further includes the step of:

detecting whether the audio information is a speech signal or a music signal.

91. The method of claim 90 wherein the generating step further includes the steps of:

generating a first signal indicative of the speech signal;

generating a second signal indicative of the music signal; and generating the selection signal in response to the first and second signals.

92. The method of claim 91 wherein the step of generating the first signal further includes the steps of:

filtering out signals except a passband signal in a frequency range which contains maximum speech energy;

detecting pauses in the passband signal; and generating the first signal indicative of speech where there is an occurrence of successive pauses in the audio information.

93. The method of claim 91 wherein the step of generating the second signal further includes the steps of:

providing a third signal responsive to a passband signal in a frequency range that contains maximum speech energy and the audio information representing a level of frequency components outside the range of the speech signal; and generating a second signal responsive to the third signal indicative of the music signal.

94. The method of claim 93 wherein the step of generating a second signal further includes the steps of:

comparing the third signal with a predetermined threshold level; and generating the second signal as indicating music where the third signal exceeds the predetermined threshold level.

95. The method of claim 91 wherein the step of generating a selection signal further includes the steps of:

generating a selection signal indicative of music where the second signal indicates music; or generating a selection signal indicative of speech where the first signal indicates speech and the second signal does not indicate music.

96. The method of claim 89 further includes the steps of:

voice encoding the speech signal; and wide-band compression encoding the music signal.

97. The method of claim 96 wherein the step of intermingling further includes:

selecting the voice encoded signal when the selection signal indicates the speech signal; or selecting the wide-band compression encoded signal when the selection signal indicates the music signal.

98. The method of claim 89 further includes the steps of:

voice encoding the speech signal;

wide-band compression encoding the music signal; and intermingling the encoded speech signal, the encoded music signal, and the identification signal in response to the selection signal.

99. The method of claim 89 further includes the steps of:

generating a timing signal responsive to the selection signal for synchronizing the identification signal with the speech and music signals; and synchronizing the identification signal with the speech and music signals by use of a latch responsive to the timing signal.

100. The method of claim 99, wherein the speech and music signals include an ASCII text signal, and further including the steps:

storing the ASCII text signal in a buffer;

storing the speech and music signals when the ASCII text is supplied for use in the intermingling step; and supplying the speech and music signals for use in the intermingling step after the ASCII text has been supplied.

101. The method of claim 89 further includes the steps of:

voice encoding the audio signals;

reconstructing audio signals from the voice encoded audio signals;

comparing the accuracy of the reconstructed audio signals with the audio signals;

generating a selection signal indicative of a speech signal in response to an accurate reproduction of the audio signals; or generating a selection signal indicative of a music signal in response to an inaccurate reproduction of the audio signals.

102. The method of claim 101 wherein the step of comparing further includes the step of comparing the difference between the reconstructed audio signal and the audio signal with a selected threshold level.

103. Apparatus for decoding digital audio information formed of signals such as speech signals and music signals, the audio information including a signal identifying the speech and music signals, comprising:

a receiver that receives combined speech, music, and identifying signals;

an identification signal decoder coupled to receive the combined speech, music and identifying signals which separates the identifying signal; and a switch coupled to receive the speech and music signals that reassembles the speech and music signals in response to the identifying signal into an audio signal, for audible presentation.

104. The apparatus of claim 103 wherein the identification signal decoder further includes:

an extractor that detects the identifying signal and extracts it from the combined speech, music and identifying signals.

105. The apparatus of claim 103 wherein the receiver further includes:

a storage circuit coupled to receive the combined speech, music, and identifying signals for storing the combined speech, music, and identifying signals; and a retriever circuit for retrieving the stored signals.

106. Method of decoding digital audio information formed of speech signals and music signals, the audio information including a signal identifying the speech and music signals, the steps including:

receiving combined speech and music signals and the identifying signal;

separating the identifying signal from the speech and music signals; and intermingling the speech and music signals into a reassembled audio signal in response to the identifying signal, for audible presentation of the reassembled audio.

107. The method of claim 106 wherein the step of separating further includes the step of detecting the identifying signal and extracting it from the combined signals.

108. The method of claim 106 wherein the step of receiving further includes the step of storing the combined speech, music, and identifying signals; and retrieving the stored signals.

* * * * *

UNITED STATES PATENT AND TRADEMARK OFFICE
CERTIFICATE OF CORRECTION

PATENT NO. : 5,809,472
ISSUE DATE : September 15, 1998
INVENTOR(S) : Eric F. Morrison It is certified that error appears in the above-identified patent and that said Letters Patent is hereby corrected as shown below:

Column 2, line 16, delete "fill" and substitute --full--.

Signed and Sealed this

Eleventh Day of May, 1999

*Attest:*

Q. TODD DICKINSON

*Attesting Officer*

*Acting Commissioner of Patents and Trademarks*